United States Patent [19]

Shimizu et al.

[11] Patent Number: 4,702,859
[45] Date of Patent: Oct. 27, 1987

[54] ELECTRICALLY CONDUCTIVE POLYAMIDE RESIN COMPOSITION

[75] Inventors: Senzo Shimizu, Osawara; Isao Nomura; Kenichi Narita, both of Hiratsuka, all of Japan

[73] Assignee: Mitsubishi Gas Chemical Company, Inc., Tokyo, Japan

[21] Appl. No.: 948,136

[22] Filed: Dec. 29, 1986

[30] Foreign Application Priority Data

Mar. 31, 1986 [JP] Japan ................................. 61-71051

[51] Int. Cl.$^4$ ............................................. H01B 1/06
[52] U.S. Cl. .................................... 252/511; 525/432; 524/495; 524/496; 252/502
[58] Field of Search ....................... 252/511, 502, 506; 524/495, 496, 538, 602; 525/420, 432

[56] References Cited

U.S. PATENT DOCUMENTS 4,562,221 12/1985 Shigemitsu ........................ 525/183
4,655,964 4/1987 Steinberger et al. ............... 252/511

Primary Examiner—Josephine L. Barr
Attorney, Agent, or Firm—Wenderoth, Lind & Ponack

[57] ABSTRACT

An electrically conductive polyamide resin composition comprising
(A) 100 parts by weight of a polyamide resin derived from xylylenediamine as a main diamine component and an alpha, omega-linear aliphatic dicarboxylic acid as a main dicarboxylic acid component,
(B) 5 to 100 parts by weight of nylon 66,
(C) 30 to 300 parts by weight of glass fibers,
(D) 5 to 40 parts by weight of furnace black, and
(E) 5 to 40 parts by weight of graphite.

2 Claims, No Drawings

ELECTRICALLY CONDUCTIVE POLYAMIDE RESIN COMPOSITION

This invention relates to an electrically conductive polyamide resin composition, and more specifically, to an electrically conductive polyamide resin composition having excellent moldability and high strength which can give molded articles having reproducible resistance values.

It is known that a polyamide resin is rendered electrically conductive by incorporating carbon black or graphite in it. If, however, the amount of carbon black or graphite to be incorporated is increased in order to increase electrical conductivity, the melt-flowability of the resulting composition is reduced, and the composition is difficult to mold by, for example, an injection molding technique. Even when it can be molded, no satisfactory article can be obtained because of short shot, for example, and the resulting article has inferior mechanical properties such as low impact strength.

It is an object of this invention to provide an electrically conductive polyamide resin composition having a novel chemical composition.

Another object of this invention is to provide an electrically conductive polyamide resin composition having excellent moldability and high strength which gives molded articles having reproducible resistance values.

Other objects and advantages of this invention will become apparent from the following description.

According to this invention, these objects and advantages of this invention are achieved by an electrically conductive polyamide resin composition comprising (A) 100 parts by weight of a polyamide resin derived from xylylenediamine as a main diamine component and an alpha, omega-linear aliphatic dicarboxylic acid as a main dicarboxylic acid component,
(B) 5 to 100 parts by weight of nylon 66,
(C) 30 to 300 parts by weight of glass fibers,
(D) 5 to 40 parts by weight of furnace black, and
(E) 5 to 40 parts by weight of graphite.

Examples of the polyamide resin (A) include polyamide resins (i.e., MX-nylon) produced by the polycondensation reaction of xylylenediamine composed mainly of m-xylylenediamine such as m-xylylenediamine itself or a mixture of 60% or more of m-xylylenediamine and 40% or less of p-xylylenediamine with an alpha, omega-linear aliphatic dicarboxylic acid having 6 to 12 carbon atoms. Specific examples of the dicarboxylic acid are adipic acid, sebasic acid, suberic acid, undecanedioic acid and dodecanedioic acid. Adipic acid is most suitable. The MX-nylons can have a relative viscosity, measured at 25° C. for a solution of 1 g of the polymer in 100 ml of 98% sulfuric acid, of generally 1.7 to 2.9, preferably 1.9 to 2.4.

Nylon 66 (B) is polyhexamethylene adipamide and is readily available commercially. Nylon 66 acts as a crystal nucleating agent for promoting crystallization of the MX nylon (A) and shortening the molding cycle time. When the properties of a molded article prepared from the resulting polyamide resin composition are considered, the amount of the MX nylon should not be too large, and if it is too small, the effect of the MX nylon is not produced. Hence, it is used in the amount indicated above.

Nylon 66 (B) is preferably used in an amount of 10 to 50 parts by weight.

The glass fibers (C) may be any type of glass fibers which are generally used for reinforcing plastics. Preferably, the glass fibers are used as chopped strands having a fiber length of about 3 to 6 mm. If the amount of the glass fibers used exceeds the upper limit specified above, the ease of extrusion of the resulting composition is markedly reduced. If it is below the lower limit, no sufficient physical properties can be obtained. Preferably, the glass fibers are used in an amount of 50 to 150 parts by weight.

Component (D) forming the composition of this invention is furnace black, preferably electrically conductive furnace black.

Other carbon blacks such as thermal black, channel black, acetylene black and Ketjen black give compositions which are unsuitable in physical and electrical properties. If the amount of furnace black exceeds the upper limit specified above, the ease of extrusion of the resulting composition is markedly reduced. If it is below the lower limit specified above, no sufficient electrical conductivity can be obtained. Preferably, the furnace black is used in an amount of 10 to 30 parts by weight.

Component (E) constituting the composition of this invention is graphite.

The graphite may be of natural or artificial origin and may be scale-like or lumpy. Natural scale-like graphite is preferred in view of the physical properties of the resulting composition and the reproducibility of its resistance values. If the amount of graphite exceeds the upper limit specified above, the ease of extrusion of the resulting composition is reduced markedly. If it is below the specified lower limit, no sufficient electrical conductivity is obtained. Preferably, graphite is used in an amount of 10 to 30 parts by weight.

The components (A) to (E) may be mixed by various methods to produce the composition of this invention. For example, a suitable method is to melt-knead them at a temperature 5° to 50° C. higher than the melting point or softening point of the polyamide resin composition either at a time or through a master batch in a usual vent-type extruder or a similar device.

In addition to the components (A) to (E), the composition of this invention may include at least one of stabilizers against deterioration by oxidation, heat, ultraviolet, etc., agents for preventing such deterioration, a nucleating agent, a plasticizer, a fire retardant, a lubricant, etc.

The conductive polyamide resin composition of this invention proves to be excellent in mechanical properties such as tensile strength, tensile modulus and flexural modulus, thermal properties such as heat distortion temperature, chemical resistance and moldability, and molded articles from it have reproducible resistance values. It is very useful as a raw material for articles which, for example, require static prevention.

The following examples illustrate the present invention more specifically.

All parts in these examples are by weight. The various properties in these examples were tested by the following methods.

(1) Specific gravity: ASTM D792
(2) Tensile strength: ASTM D638
(3) Tensile modulus: ASTM D638
(4) Flexural strength: ASTM D790
(5) Flexural modulus: ASTM D790
(6) Izod impact strength: ASTM D256
(7) Heat distortion temperature: ASTM D648
(8) Volume inherent resistivity: ASTM D257

(9) Surface inherent resistivity: ASTM D257

EXAMPLE 1

Two hundred parts of poly(m-xylylene adipamide) (to be abbreviated as "nylon MXD6"), 20 parts of nylon 66, 120 parts of glass fibers (made by Asahi Fiber Glass Co., Ltd.) having a fiber length of 3 to 6 mm, 45 parts of natural scale-like graphite powder (Special CP, produced by Japan Graphite Co., Ltd.) and 15 parts of highly conductive furnace black (Vulcan XC-72, a product of Cabbot Corporation) were melt-kneaded by a single screw vent-type extruder at a cylinder temperature of 275° C. and extruded into a strand. The extruded strand was cooled with a water bath, cut into pellets, and dried to obtain a polyamide resin composition.

The pellets were injection-molded under the following conditions to obtain test pieces which were tested for various properties.
Resin temperature: 260° C.
Die temperature: 130° C.
Injection and pressure maintenance time: 7 seconds
Cooling time: 15 seconds
Injection pressure: 450 to 600 kg/cm$^2$
The results are shown in Table 1.

EXAMPLES 2-3

Example 1 was repeated except that the types or the amounts of the components were changed as indicated in Table 1. The results are also shown in Table 1.

COMPARATIVE EXAMPLES 1-4

For comparison, Example 1 was repeated except that furnace black was replaced by Ketjen black or thermal black (Comparative Examples 1 and 2), no graphite was added (Comparative Example 3), or furnace black was not added (Comparative Example 4). The results are shown in Table 1.

TABLE 1

|  |  | Example 1 | Example 2 | Example 3 | Comparative Example 1 | Comparative Example 2 | Comparative Example 3 | Comparative Example 4 |
|---|---|---|---|---|---|---|---|---|
| Amounts mixer (Parts by weight) | Nylon MXD6 | 200 | 200 | 200 | 200 | 200 | 200 | 200 |
|  | Nylon 66 | 20 | 20 | 20 | 20 | 20 | 20 | 20 |
|  | Conductive furnace black | 15 | 30 | 45 | — | — | 60 | — |
|  | Ketjen black | — | — | — | 15 | — | — | — |
|  | Thermal black | — | — | — | — | 15 | — | — |
|  | Scale-like graphite | 45 | 30 | 15 | 45 | 45 | — | 60 |
|  | Glass fibers | 120 | 120 | 120 | 120 | 120 | 120 | 120 |
| Properties | Specific gravity | 1.57 | 1.55 | 1.54 | 1.57 | 1.58 | 1.53 | 1.57 |
|  | Tensile strength kg/cm$^2$ | 1600 | 1550 | 1530 | 1260 | 1380 | 1290 | 1580 |
|  | Tensile modulus 10$^3$ kg/cm$^2$ | 165 | 159 | 149 | 155 | 158 | 133 | 174 |
|  | Flexural strength kg/cm$^2$ | 2210 | 2130 | 2150 | 1850 | 1970 | 1840 | 2090 |
|  | Flexural modulus 10$^3$ kg/cm$^2$ | 154 | 144 | 133 | 135 | 136 | 121 | 146 |
|  | Izod impact strength kg-cm/cm (⅛ inch notched) | 9.1 | 6.8 | 5.9 | 7.2 | 7.1 | 5.7 | 10.0 |
|  | Heat distortion temperature °C. | 218 | 216 | 213 | 216 | 212 | 209 | 216 |
|  | Volume inherent resistivity Ω.cm | $4.0 \times 10^6$ | $7.5 \times 10^4$ | $5.5 \times 10^3$ | $1.6 \times 10^3$ | $2.5 \times 10^4$ | $2.1 \times 10^3$ | $3.6 \times 10^8$ |
|  | Surface inherent resistivity Ω | $2.2 \times 10^4$ | $3.4 \times 10^4$ | $2.0 \times 10^3$ | $1.6 \times 10^2$ | $2.5 \times 10^4$ | $2.1 \times 10^2$ | $1.6 \times 10^8$ |

What is claimed is:

1. An electrically conductive polyamide resin composition comprising
    (A) 100 parts by weight of a polyamide resin derived from xylylenediamine as a main diamine component and an alpha, omega-linear aliphatic dicarboxylic acid as a main dicarboxylic acid component,
    (B) 5 to 100 parts by weight of nylon 66,
    (C) 30 to 300 parts by weight of glass fibers,
    (D) 5 to 40 parts by weight of furnace black, and
    (E) 5 to 40 parts by weight of graphite.
2. The polyamide resin composition of claim 1 wherein the furnace black (D) is electrically conductive furnace black, and the graphite (E) is natural scale-like graphite.

* * * * *